March 19, 1946.　　　L. C. GOODWIN　　　2,397,001
TRAILER HITCH
Filed May 29, 1944　　　2 Sheets-Sheet 2
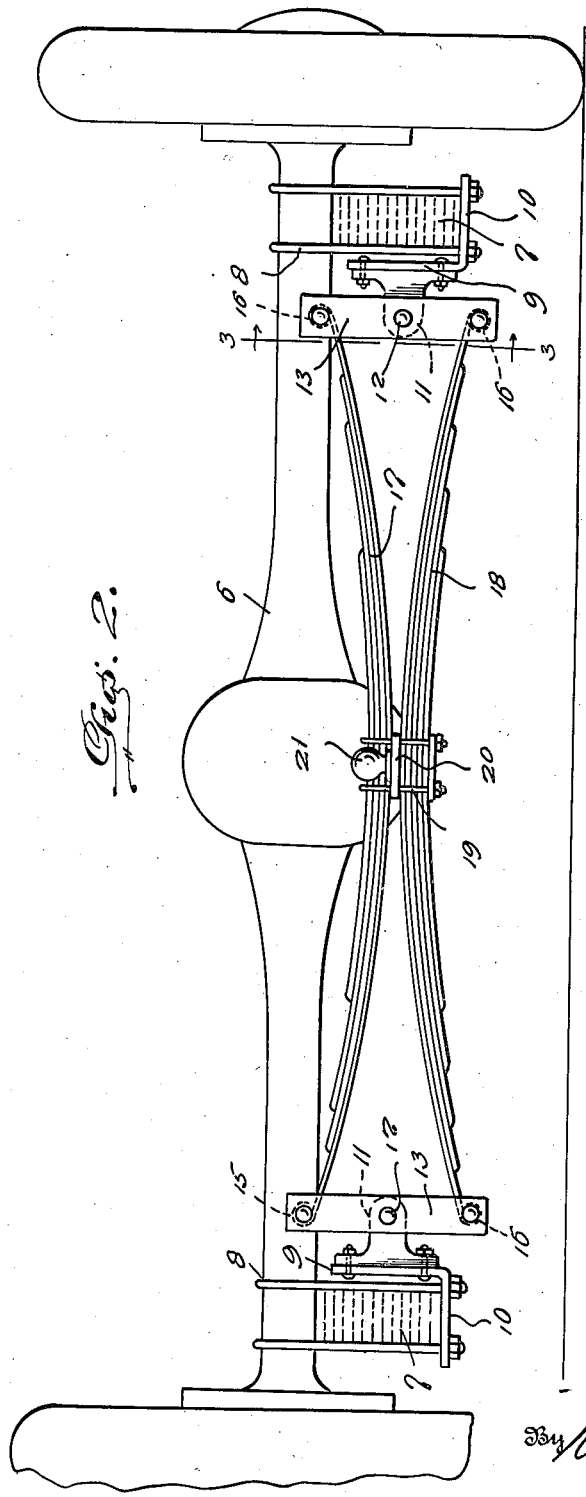
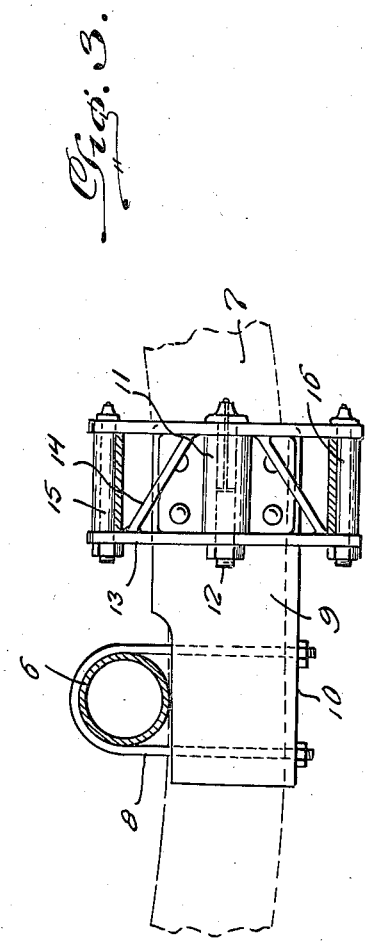
Inventor
Lester C. Goodwin, Patented Mar. 19, 1946

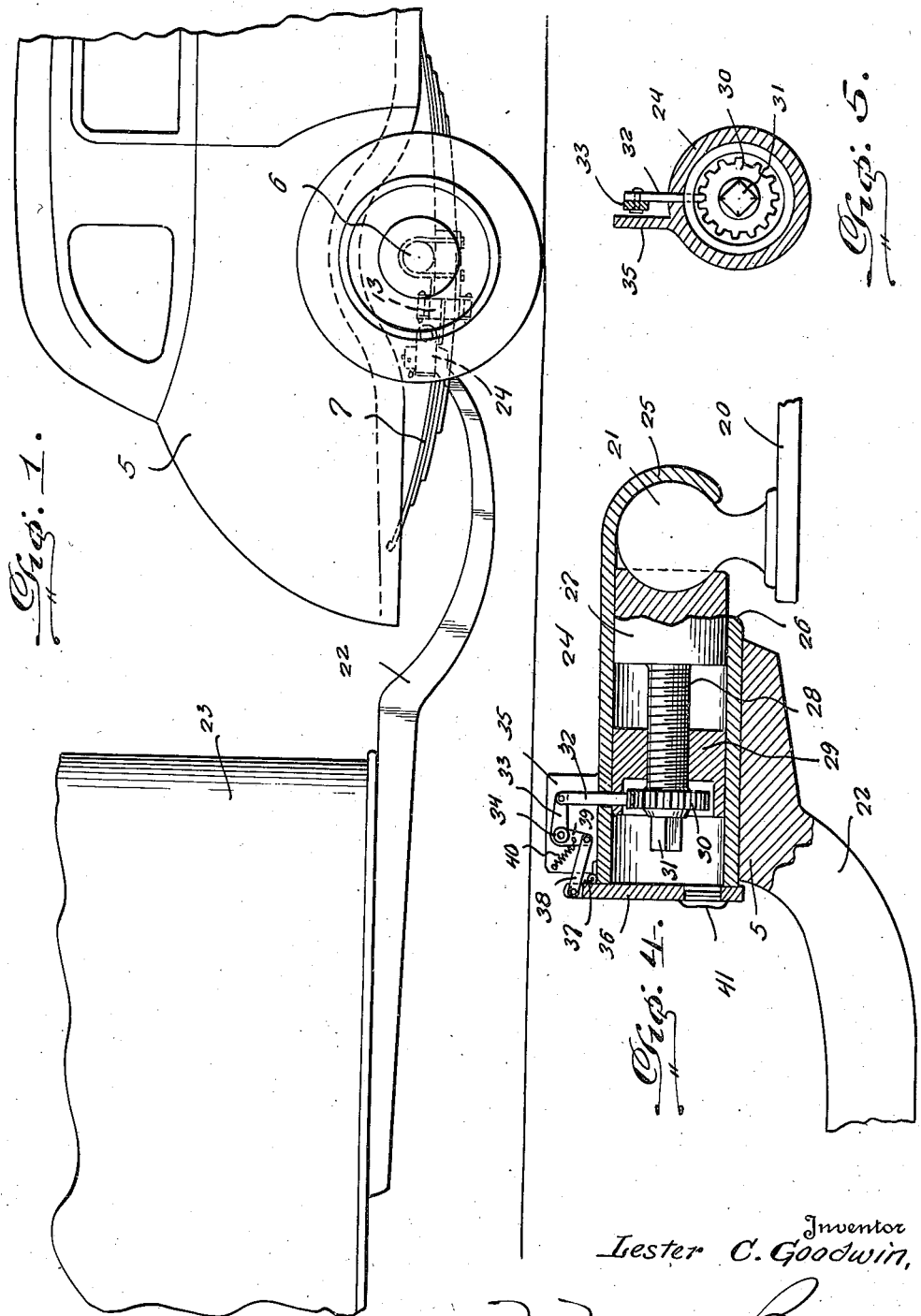

2,397,001

UNITED STATES PATENT OFFICE 2,397,001

TRAILER HITCH

Lester C. Goodwin, Hornell, N. Y.

Application May 29, 1944, Serial No. 537,836

3 Claims. (Cl. 280—33.17)

The present invention relates to new and useful improvements in trailer hitches and has for its primary object to provide spring suspension means for the front end of the tow bar of the trailer and which is carried by the towing car.

A further important object of the present invention is to provide spring suspension means between the tow bar of the trailer and the tow car whereby road shocks subjected to the tow car will not be transmitted to the trailer and vice versa.

A further important object of the invention is to provide means for coupling and uncoupling the trailer hitch to the tow car without necessitating the driver reaching his hands under the car and thus avoid possible injury thereto.

A still further object of the invention is to provide an apparatus of this character of simple and practical construction, which is efficient and reliable in performance, relatively inexpensive to manufacture and installed in operative position on a tow car without necessitating any changes in construction thereof and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view showing the trailer hitch in position.

Fig. 2 is a rear elevational view of the spring suspension means for the trailer hitch carried by the tow car.

Fig. 3 is a sectional view taken substantially on the line 3—3 of Fig. 2.

Fig. 4 is a longitudinal sectional view through the trailer hitch, and

Fig. 5 is a sectional view taken substantially on a line 5—5 of Fig. 4.

Referring now to the drawings in detail, wherein for the purpose of illustration I have disclosed a preferred embodiment of the invention, the numeral 5 designates an automobile of conventional construction and which, in the present instance, constitutes the tow car. The automobile includes the rear axle 6 having the springs 7 secured thereto by the U-bolts 8 in the usual manner.

An axle mounting 9 is disposed vertically at the inside of each of the springs 7, the mounting including an outwardly extending plate 10 at its lower end secured to the bottom of the springs 7 by the U-bolts 8.

The mounting 9 is formed with a bearing 11 in which a pin 12 is positioned for pivotally supporting the intermediate portion of a pair of upstanding spaced apart shackle plates 13, the plates being connected by brace members 14.

Upper and lower shackles 15 and 16 are journalled in the upper and lower ends respectively of the plates 13 and to which the ends of upper and lower semi-elliptical springs 17 and 18 are supported.

The springs 17 and 18 are oppositely arranged as shown in Fig. 2 of the drawings and extend transversely of the automobile 5 immediately rearwardly of the rear axle 6, the ends of the springs diverging and the center of the springs are connected by U-bolts 19 and which also serve to secure a plate 20 between the springs, the plate extending rearwardly thereof and having a ball 21 rising from its rear end.

The tow bar 22 of the trailer 23 is formed at its front end with a longitudinally extending tubular member 24 having its front end rounded as at 25 to provide a socket having an opening 26 in its bottom portion adapted to receive the ball 21. The ball 21 is held inwardly of the socket against the front end 25 thereof by a clamping head 27 slidably mounted in the tubular member 24 and actuated by a screw 28 threaded through a block 29 secured adjacent the rear end of the tubular member 24, the longitudinal movement of the head 27 serving to engage and release the ball 21.

The portion of the screw 28 rearwardly of the block 29 is formed with a toothed flange 30 and the rear end of the screw is squared as at 31 to accommodate the socket of a crank for manipulating the screw.

The screw 28 and head 27 are locked against movement by a dog 32 having one end movable into engagement with the teeth 30, the dog being slidably inserted through the top of the tubular member 24 and having its upper end pivotally attached to the outer end of a crank arm 33 extending rearwardly from a pin 34 journalled in a plate 35 rising from the top of the tubular member 24 adjacent its rear end.

A cover plate 36 is provided for the rear end of the tubular member 24 and is hingedly connected thereto at its upper edge as at 37 to gravitate into closed position. To the upper end of the cover 36 is attached a link 38, the link extending rearwardly and having its rear end pivotally attached to the lower end of a crank arm 39 extending downwardly from the pin 34.

A coiled spring 40 is attached to the crank arm 39 to urge the cover plate 36 into closed position and also to urge the crank arm 33 and the dog 32 downwardly for engaging the teeth 30 of the screw, thus locking the screw against movement when the cover plate 36 is in its closed position.

A lip 41 projects outwardly from one edge of the cover plate 36 adapted for engagement by a crank for raising the cover plate 36 upwardly into a position so that the crank may be placed on the squared end 31 of the screw for manipulating the latter in a manner to cause an engagement or disengagement of the head 27 with the ball 21.

From the foregoing it will be apparent that the trailer hitch may be easily and quickly connected to the tow car without necessitating the driver reaching under the car.

It is believed the details of construction, manner of operation and advantages of the device will be readily understood from the foregoing without further detailed explanation.

Having thus described the invention, what I claim is:

1. A trailer hitch comprising a pair of semi-elliptical springs oppositely arranged with their ends diverging, means connecting the center of the springs together, connecting means between the ends of said springs, shackles carried by a tow car and engaged with said connecting means to support the ends of the springs, a ball carrying plate clamped between the springs at their centers, a tow bar carried by a trailer, and coupling means between the tow bar and the ball.

2. A trailer hitch comprising a tow bar carried by a trailer, a tubular member mounted on said tow bar and having one end closed and forming a ball engaging socket, a cover hingedly mounted on the opposite end of said tubular member to close said end, said tubular member having an opening in its lower side adapted to receive the ball for positioning in the socket, a clamping head slidably mounted in the tubular member for engaging and clamping the ball in the socket, screw means housed within said tubular member for adjusting the head, said cover being movable to open position to give access to said adjusting means, means for locking the screw means against movement, and other means operable with the opening and closing movements of said cover to respectively unlock and lock said locking means.

3. A trailer hitch comprising a tow bar carried by a trailer, a tubular member mounted on said tow bar and having one end closed and forming a ball engaging socket, said tubular member having an opening in its lower side adapted to receive the ball for positioning in the socket, a clamping head slidably mounted in the tubular member for engaging and clamping the ball in the socket, screw means for adjusting the head, a toothed flange carried by the screw means, a cover plate pivoted on the other end of the tubular member, a dog engaging the teeth of the flange, and means connecting the cover plate to the dog for moving the latter into and out of engaging position upon the closing and opening movement of the cover plate.

LESTER C. GOODWIN.